Figure 1:
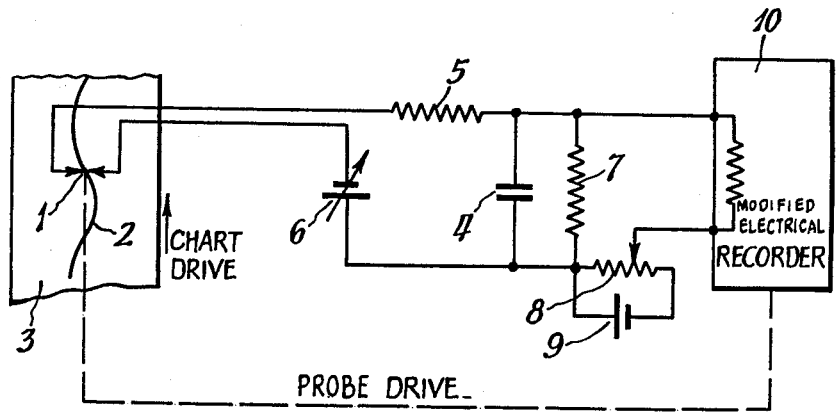

United States Patent Office 3,075,186
Patented Jan. 22, 1963

3,075,186
PROGRAM CONTROLLERS
Clive Keith Coogan, East Melbourne, Victoria, Australia, assignor to Commonwealth Scientific and Industrial Research Organization, East Melbourne, Victoria, Australia, a corporation
Filed Mar. 3, 1958, Ser. No. 718,818
Claims priority, application Australia Mar. 5, 1957
1 Claim. (Cl. 340—187)

This invention relates to program controllers and especially to such devices of the curve-following type.

It is sometimes necessary to generate accurately a current, potential, resistance, capacitance or a process-variable which is proportional to some other variable. Very often this function varies with time or can be expressed in that form, i.e., $$F = f(t)$$

This problem arises in some applications of analogue computers, and a number of devices have been suggested which are designed to produce either periodic analytical functions or arbitrary functions of time.

One special case of this problem is that of the program controller of the curve-follower type, in which it is required that a pointer trace out the curve of an arbitrary given function on a chart, and thus vary an electrical parameter such as resistance or current, so that operations such as differentiation, integration or multiplication of this function may be carried out.

Another special case is that of the process programmer, where the value of some variable is required to follow a given function of time. Examples are found in furnace programming for curing and annealing, or control of flow rates or pressure, according to pre-arranged schedules.

Further applications are found in programming a monochrometer slit to vary with wavelength (which can be expressed as a function of time in automatically driven monochrometers) to produce a constant energy output, or in programming the speed of the wavelength drive motor to produce a linear wavelength-time relationship.

In most of the above applications it may be necessary to change or amend the form of the function $f(t)$ quite often so that it is important that the function can be set up simply and quickly.

Curve-followers of the photoelectric type have been produced, but the electronics are complex and it is accordingly the main object of the present invention to provide an efficient program controller of the curve-following type which is considerably simpler and cheaper to construct than the photoelectric type known at the present time.

Further objects and advantages of the invention will become apparent as the ensuing description proceeds.

According to the invention, a device of the type referred to comprises a line drawn on a chart, with the two co-ordinates of the points along the line representing the relationship of two elements of the desired program, a detecting means positionally controlled by one element of the program and operative to detect the presence or absence of the line, the detecting means including a capacitor, the condition of which is varied according to the presence or absence of the line relative to said detecting means, and means controlled by the condition of the capacitor to vary said one element of the program in order to return the detecting means to the line when said one element becomes such that the line is absent relative to the detecting means. The program line may be linear or non-linear and the device may be used either as a process controller in which the other of the two program elements or variables is time, or in conjunction with an x-y recorder, it may be applied where the other or second element or variable is one other than time.

Devices in accordance with one aspect of the invention make use of the conductance of an ordinary pencil line on paper. The resistance of typical chart paper used in recorders is of the order $10^9\Omega$ per square, whereas a moderately soft pencil produces a mark on paper the resistance of which is about $5 \times 10^4\Omega$/sq. or less. One device embodying the invention utilises the conductivity of the pencil line on a chart between two small probes which are set as close as possible to one another, to complete the charging circuit of a capacitor, which controls one element of the program in such a way as to return the probes to the pencil line when said one element becomes such that the line does not bridge the probes.

Devices in accordance with another aspect of the invention incorporate a single probe and a fixed metal base plate, over which the chart moves. When the probe is off the pencil line, there is a certain capacity between it and the metal base plate. This capacity is increased when the probe rests on the pencil line, and the change in capacity operates a capacity sensitive switch, which completes the charging circuit of a capacitor and the latter, in turn, controls one element of the program in such a way as to return the probe to the pencil line when said one element of the program becomes such that the line is absent relative to the probe.

Figure 2:
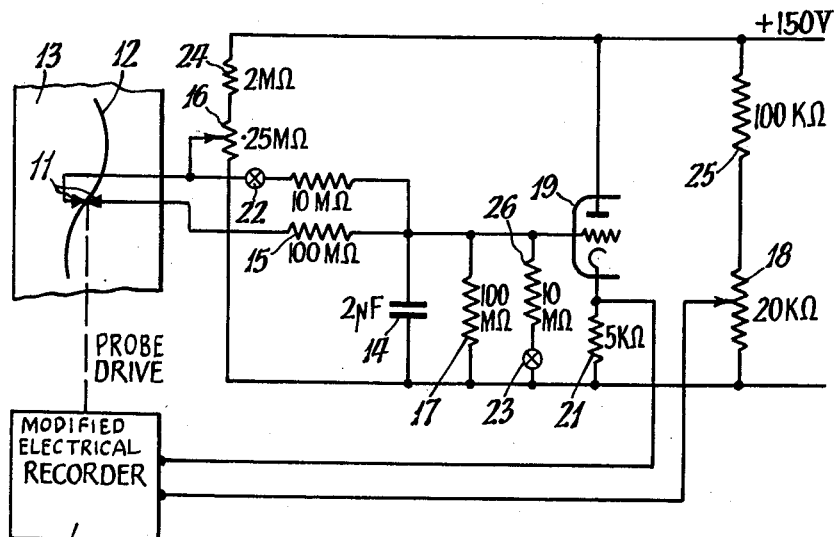
Figure 3:
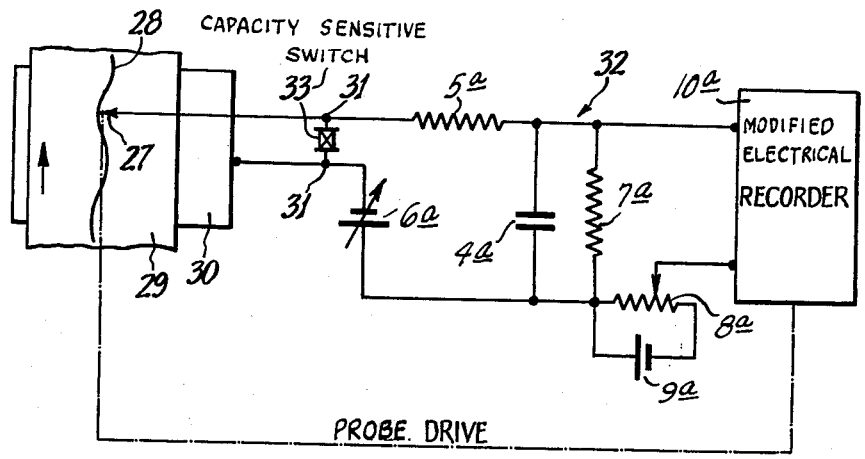
Figure 4:
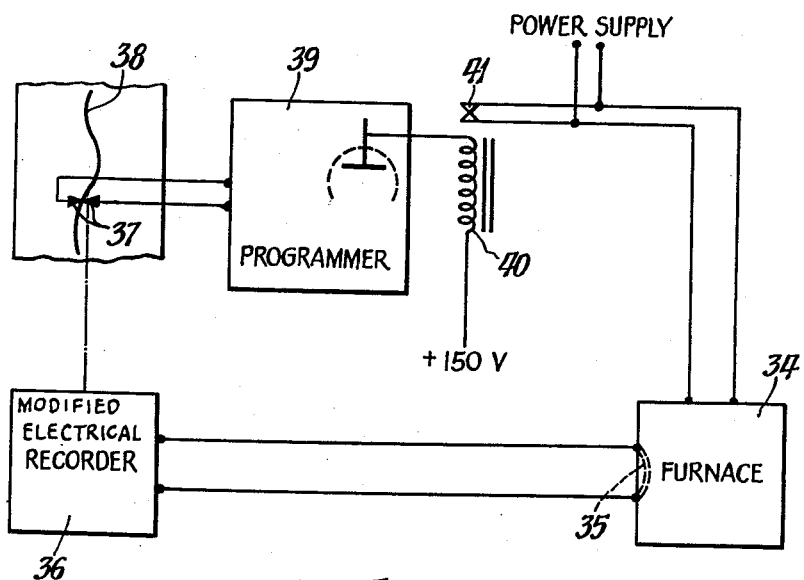

Programmers of the curve-following type in accordance with the present invention will now be described, by way of example, with reference to the accompanying drawings, in which:

FIGURE 1 shows a non-electronic version of the curve-follower of the type using two probes, FIGURE 2 shows an electronic type curve-follower of the two probe type, operating from A.C. supply lines and providing a rectifier in its circuitry, FIGURE 3 shows a non-electronic version of the curve-follower of the type using only one probe and a metal base plate, and FIGURE 4 illustrates an application of a program controller according to the invention to programming the temperature of a furnace.

In the embodiment of the invention shown in FIGURE 1 of the accompanying drawings, a slightly modified electrical recorder of the potentiometer or direct moving kind (such as a Fielden Servograph recorder) is used as the basis of the follower. In this case, the synchronous chart drive motor is used to drive the chart paper 3 as usual. In FIGURE 1, the chart paper moves vertically upward, such movement representing the passage of time which may be one of the elements of the desired program. In place of the usual pen, two smooth probes 1 are attached to the pen arm so that they touch the chart paper at isochronous points, that is, points on the same time ordinate, which are spaced about 0.5 mm. apart on that same time ordinate. The probes, which can conveniently be made from relay contacts, must be isolated from one another and from the recorder frame. They are lightly sprung against the chart paper to ensure good contact, and the resistance between them is of the order of 20 KΩ.

A line 2 is drawn on the chart 3 in soft pencil representing the required function. The edge of the line should be fairly sharp, though extreme care need not be exercised, and any soft pencil, such as 2B or softer, can be used. The width of the line should be about 2 mm.

Generally, the thickness of the line should be greater than the sum of the distance between the probes 1 and the hunting amplitude, if there is to be a conduction path whenever the contacts are on the line. In addition the mean thickness of line 2 should be a little greater than the above mentioned sum in case the edge of the line is imperfect.

The probes 1 are electrically connected to a condenser 4 through a resistor 5 and a source of charging voltage 6. The condenser 4 is connected in parallel with a resistor 7, and further is connected in series with a biasing potentiometer 8 and a source of biasing voltage 9. The recorder 10 is connected effectively across the condenser 4. In operation, the synchronous chart drive motor is used to drive the chart paper 3 in the vertically upward direction, as viewed in FIGURE 1, and the two probes 1 attached to the pen arm of the recorder are movable laterally, that is, toward the left and right as viewed in FIGURE 1, in order to follow the pencil line 2 representing the program to be followed. When both probes are on the pencil line, the conducting pencil mark on the paper completes the electrical circuit between the probes. The source 6 then charges the condenser 4 through the resistor 5, and in doing so impresses a greater voltage on the input terminals of the recorder 10, causing an increased displacement of the recorder pen arm away from its zero position, thus moving the probes toward the left-hand side of the pencil line on the chart. When the probes move to the left off the pencil line, the charging circuit is broken and the condenser 4 discharges through resistor 7, the voltage impressed on the recorder input terminals is reduced and the recorder pen arm moves in the right-hand direction towards its zero position, thus returning the probes 1 again to the pencil line 2, whereupon the cycle is repeated. In the above it has been assumed that the recorder input impedance is large compared with the value of the resistor 7, which condition usually holds in practice.

The system as a whole forms an on-off control system, which is not analytically tractable, but qualitatively the factors which govern the frequency of hunting, the hunting amplitude and the central or average position of the pen arm, are:

(1) The rise rate of the condenser system;
(2) The decay rate of the condenser system; and
(3) The friction, backlash, damping and inertia of the recorder mechanism together with its electrical hysteresis.

It is desirable for the rise and decay rates of the condenser system to be about the same, and for the equivalent rate of movement of the recorder pen arm to be considerably less than the rate at which the recorder pen arm is capable of moving soon after commencing a small excursion, to limit hunting.

The decay rate of the condenser is given by the equation:

$$\left(\frac{dV_4}{dt}\right) \text{decay} = V_4/R_7 C_4$$

where $V_4$ is the voltage across the capacitor or condenser 4 at the instant when one probe leaves the line and thus breaks the charging circuit; $R_7$ is the value of resistor 7 and $C_4$ is the value of capacitor 4 in corresponding units.

If the hunting error is to be about the same all over the scale, an almost constant decay rate is required. A small differential of $V_4$ must then correspond to full scale on the recorder chart. This is achieved by biasing off the condenser potential to make a convenient value of $V_4$, for example $V_B$, correspond to the recorder zero, with $V_B$ being the voltage between the junction of potentiometer 8 and resistor 7 and the movable tap of potentiometer 8. The decay rate, which is proportional to $V_4$ may be varied by changing the biasing zero point, i.e., by varying $V_B$, which is accomplished by changing the setting of the potentiometer 8.

The rise rate is governed by the charging voltage, $V_6$ and the resistance $R_5$, $V_6$ being the charging voltage from source 6 and $R_5$ the value of the resistor 5. This rise rate may be easily varied by changing the charging voltage.

When the rise and the decay rates are the same, the average position of the contacts is at the left-hand side of the line, and the "on" and "off" times are about equal. If the decay and rise rates are set equal near the center of the scale, the decay rate decreases and the rise rate increases when the contacts are nearer zero, and vice versa when near the top of the scale. This displaces the average position of the contacts with respect to the left-hand side edge of the pencil line, but if the hunting amplitude is small, the errors introduced thereby are negligible.

Since most recorders are operated from electric current supply lines, it is more convenient to use such current to generate the charging and biasing D.C. voltages, and several simple electronic function followers have been built. They have the added advantage of not being restricted to high recorder input impedance.

FIGURE 2 of the accompanying drawings shows the circuit of an electronically operated curve-follower and also typical values for the circuit components.

Referring to FIGURE 2, it will be seen that, as in FIGURE 1, the probes 11 are situated adjacent to the pencil line 12 on chart paper 13, and are movable together toward the left and right, as viewed in the drawing, while the chart paper is driven vertically upward. The electrical circuit from one of the probes leads through a resistor 15 to a parallel combination of a condenser 14 and a resistor 17, and thence to the grid circuit of a tube 19. The lead from the other probe goes to potentiometer 16, which variably determines the charging voltage for the capacitor 14. The output of the tube 19 is taken across the cathode self-bias resistor 21 and the potentiometer 18 and fed to the recorder 20. Push button switches 22 and 23 are provided for a fast rise or fall of the pen arm to position the probes initially. Two high tension bleeder resistors 24 and 25 and a grid resistor 26 complete the circuit. The tube 19 is a double triode, one half of which is used to rectify the A.C. supply to obtain the high tension voltage and is not shown on the diagram. The other half is used as an impedance changer, in the cathode follower connection shown, allowing large values of resistance to be used in the circuit of condenser 14 with the associated benefits of long time constants being obtainable with only a small capacitance. The operation of the circuit is exactly the same as that of the circuit of FIGURE 1, and is not described again. The rise and decay rates are controlled by adjustments of the potentiometers 16 and 18 respectively.

The output voltage differential across which the recorder is coupled is, with the circuit component values as shown in FIGURE 2, about 1 volt, which gives full scale deflection on the recorder. Higher output voltages can of course be obtained by normal voltage amplification methods.

There is a further advantage in using this electronic version as the charging impedance of the condenser circuit can be made so high as to render any lack of uniformity in the pencil line negligible, and dispense with the requirement for very soft pencils.

In another construction, the pen arm drive shaft of the recorder is coupled mechanically to the shaft of a potentiometer across which a fixed voltage is placed. Then movement of the pen arm taps off an output voltage across the potentiometer proportional to the pen deflection. If the output is to be in the form of resistance, capacitance or inductance etc. the shaft of the variable element is mechanically linked to the pen arm shaft as above.

In another device in accordance with the invention, a single-contact probe is attached to the pen arm of the recorder.

Referring to FIGURE 3 which shows a simple non-electronic curve-follower of the one probe type, it will be seen that a probe 27 moves adjacent to a pencil line 28 on a recorder chart 29, beneath which a metal base plate 30 is situated, while the chart 29 is movable vertically upward and the pen arm carrying probe 27 is movable toward the left and right, as viewed in the drawing. The single probe and the metal base plate are both electrically connected to the input terminals 31 of a condenser charging circuit 32, having a condenser 4a, resistor 5a, source of charging voltage 6a, resistor 7a, potentiometer 8a, biasing voltage source 9a and recorder 10a connected as described in relation to the corresponding numbered elements of FIGURE 1. Across the terminals 31 there is connected a commercially available two position switch 33 which is actuated by changes in the capacity between terminals 31, of say 0.5 pf. In operation, when the probe 27 is off the pencil line 28, there is a certain capacitance between the probe 27 and the base plate 30. When the probe is on the pencil line this capacitance is increased due to the additional presence of the pencil line between the probe and the paper. This change in capacitance closes the capacity sensitive switch 33. On the closing of this switch 33, the condenser 4a is charged from the source 6a and the recorder pen arm moves away from zero, carrying the probe off the left-hand side of the pencil line and reducing the capacitance between the probe and base plate. This change opens the switch again and allows the condenser 4a to discharge through resistor 7a, as explained before, and the recorder pen arm carrying the single probe returns to the pencil line on the chart. This on-off cycle is then repeated during the whole working period.

It has been found that the capacity between about 1 cm. of a 2B pencil line about 1 mm. wide on the chart paper, and the metal backing plate is sufficient to operate the switch 33 reliably. With this form of the programmer, the width of the pencil line that is required can be reduced to little more than the hunting amplitude of the system. Lines of about 1/16" width are normally satisfactory, but this of course will depend on the conditions of operation, e.g., the time constants of the programmed variable etc. which govern the hunting amplitude.

As a typical example of the use of a device in accordance with the invention, reference will now be made to FIGURE 4 which illustrates the application of the invention to programming the temperature of a furnace.

The furnace 34 has provided in it a temperature-voltage transducer, in this case a thermocouple 35, which supplies a voltage signal, proportional to the furnace temperature, to the recorder 36, so that the pen arm of the latter moves to trace out the curve representing the actual temperature of the furnace. This recorder pen arm is provided with two probes 37, which, as in the devices of FIGURES 1 and 2, lie initially adjacent to a pencil line 38 on the recorder chart representing the desired temperature program of the furnace. As the recorder pen arm, governed by actual temperature conditions in the furnace, moves the probes 37 away from the program line 38, the programmer 39 acts in the manner described above to energise the relay 40, and actuate the switch 41 which controls the supply of power to the furnace. Thus the heating power is switched off when the temperature is too high, and switched on again when the temperature returns to the required, programmed level.

The programmer functions as an "on-off" controller in which the control temperature is continuously variable with time. The rise rate is governed by the power delivered to the furnace during the "on" part of the cycle and the decay rate by the power delivered during the "off" part of the cycle.

For best operation the rise and decay rates should be about equal and under these conditions the average temperature will be defined by the left hand side edge of the pencil line as viewed in FIGURE 4. The hunting amplitude will be about the same as for an "on-off" controller at the same temperature with the same dead-zone as the recorder.

The same circuit can be used as a function generator, employing the relay contacts to charge or discharge a condenser when the probe contacts are in the appropriate position.

In spectrophotometers, a correction factor with respect to wavelength has to be applied to the output voltage from the photomultiplier amplifiers and according to a further application of devices in accordance with the invention, the correction curve which must be followed can be drawn on the recorder by its own pen, either as a point by point process at specific wavelengths, which correspond to specific points on the plot of the correction with respect to time, or continuously. This can be done by varying the position of the pen arm and attached variable electrical element by manually varying the input to the recorder from a dry cell and potentiometer until the required final output (a null) is obtained. The curve traced is then pencilled and the pen removed and the single or double contact probe clipped into its place. It will be apparent that this offers considerable gain in convenience and accuracy over even the 40 point "electrical-cam" of the Cary spectrophotometer.

In the case of the required function or program not being a function of time, but of some other variable, a similar adaptation could be made to an x-y recorder where one axis represents the controlling parameter, and the motion of the contact or contacts along this axis is controlled directly by it.

It will be apparent that, although the probes of the devices illustrated in the drawings are movable toward the left and right with respect to the chart paper which is moved vertically upward, it is only necessary that the probes and chart paper move in directions that are at right angles to each other.

It will thus be apparent to those skilled in the art that this invention provides an efficient program controller which is considerably cheaper and simpler in construction than the known devices, and at the same time has a wide range of application. It is also to be understood that the invention is not limited by or to the above-contained descriptions of various specific devices and that modifications and developments may be made without departing from the spirit and scope of the invention as defined in the appended claim.

I claim:

A program controller of the curve-following type, comprising an electrical recorder of the potentiometer type having an input and including a chart drive for moving a chart in one direction and a recorder arm displaced transversely with respect to said one direction in accordance with the amplitude of voltage impressed on said input of the recorder, a chart moved by said chart drive in said one direction and having an electrically conductive line drawn thereon with the two co-ordinates of the points along said line in said one direction of movement and transversely with respect to said one direction, respectively, representing the desired relationship of an independent variable and a variable dependent thereon, said recorder being modified by a pair of contact probes engageable with said chart and being mounted on said arm for displacement by the latter transversely with respect to said one direction of movement of the chart, said pair of probes being spaced apart in the direction of said displacement thereof by a distance less than the width of said line so as to be adapted for simultaneous contact with the latter, means sensitive to the actual value of said dependent variable to impress a corresponding voltage on said input of the modified recorder so that said probes are continuously disposed transversely with respect to said one direction of movement of the chart at positions corresponding to said actual value of the dependent variable, a capacitor, an electrical charging circuit for said capacitor having said probes interposed therein so that said capacitor is charged when both of said probes simultaneously contact said conductive line and said capacitor is discharged when at least one of said probes rides off said conductive line, and means controlled by the electrical condition of said capacitor to vary the actual value of said dependent variable in the sense tending to displace said probes away from said conductive line when said capacitor is being charged through said circuit and to vary the actual value of said dependent variable in the opposite sense tending to displace the probes toward said line during discharging of said capacitor, thereby ensuring the maintenance of substantially said desired relationship of the independent and dependent variables.

References Cited in the file of this patent

UNITED STATES PATENTS

| | | |
|---|---|---|
| 2,121,211 | Padva | June 21, 1938 |
| 2,354,391 | McCourt | July 25, 1944 |
| 2,594,716 | Bailey | Apr. 29, 1952 |
| 2,611,115 | Johnston | Sept. 16, 1952 |
| 2,677,310 | Campbell | May 4, 1954 |
| 2,679,622 | Deri | May 25, 1954 |
| 2,837,046 | Carson et al. | June 3, 1958 |

OTHER REFERENCES

The Radio Amateur's Handbook, 1947, 24th Edition, pp. 63, 68.